US007451024B2

(12) United States Patent
Brusarosco et al.

(10) Patent No.: US 7,451,024 B2
(45) Date of Patent: Nov. 11, 2008

(54) TYRE, WHEEL, METHOD AND SYSTEM FOR MONITORING THE TYRE, AND METHOD FOR CONTROLLING A VEHICLE

(75) Inventors: Massimo Brusarosco, Milan (IT); Anna Paola Fioravanti, Milan (IT); Federico Mancosu, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 364 days.

(21) Appl. No.: 10/508,836

(22) PCT Filed: Mar. 25, 2003

(86) PCT No.: PCT/EP03/03088

§ 371 (c)(1),
(2), (4) Date: Apr. 11, 2005

(87) PCT Pub. No.: WO03/082644

PCT Pub. Date: Oct. 9, 2003

(65) Prior Publication Data

US 2005/0234613 A1    Oct. 20, 2005

(30) Foreign Application Priority Data

Mar. 28, 2002  (EP) ................. PCT/EP02/03498

(51) Int. Cl.
*B60C 23/00*  (2006.01)
*B60C 23/02*  (2006.01)
*B60C 23/04*  (2006.01)

(52) U.S. Cl. .................. 701/29; 73/146; 340/443

(58) Field of Classification Search ............ 701/22, 701/29; 73/146; 340/443

See application file for complete search history.

(56) References Cited

U.S. PATENT DOCUMENTS 5,247,831 A * 9/1993 Fioravanti ........... 73/178 R (Continued)

FOREIGN PATENT DOCUMENTS

EP    0 887 211 A1    12/1998

(Continued)

OTHER PUBLICATIONS

Integrated longitudinal and lateral tire/road friction modeling and monitoring for vehicle motion control: Li Li; Fei-Yue Wang; Qunzhi Zhou; Intelligent Transportation Systems, IEEE Transactions on: vol. 7, Issue 1, Mar. 2006 pp. 1-19 Digital Object Identifier 10.1109/TITS.2005.858624.*

(Continued)

*Primary Examiner*—Cuong H Nguyen
(74) *Attorney, Agent, or Firm*—Finnegan, Henderson, Farabow, Garrett & Dunner, L.L.P.

(57) ABSTRACT

A method for monitoring a tire during running includes acquiring and storing, at least temporarily, a first curve representing an acceleration profile of a first point of a tread area of the tire; acquiring and storing, at least temporarily, at least one second curve representing an acceleration profile of a second point of the tread area; and comparing the first curve and the at least one second curve, or parameters derived from the first curve and the at least one second curve, so as to determine a dynamic behavior of the tire. The first and second points are located substantially on a same meridian plane of the tire. A related tire, wheel for a vehicle, system for monitoring a tire during running, and method for controlling a vehicle are also disclosed.

17 Claims, 5 Drawing Sheets

U.S. PATENT DOCUMENTS

| | | | | |
|---|---|---|---|---|
| 5,561,415 | A * | 10/1996 | Dieckmann | 340/444 |
| 5,771,480 | A * | 6/1998 | Yanase | 701/80 |
| 5,825,286 | A * | 10/1998 | Coulthard | 340/447 |
| 6,163,747 | A * | 12/2000 | Matsuno | 701/80 |
| 6,204,758 | B1 | 3/2001 | Wacker et al. | |
| 6,561,018 | B2 * | 5/2003 | Mancosu et al. | 73/146 |
| 6,577,941 | B2 * | 6/2003 | Kawasaki et al. | 701/70 |
| 6,763,288 | B2 * | 7/2004 | Caretta et al. | 701/1 |
| 7,313,952 | B2 * | 1/2008 | Brusarosco et al. | 73/146 |
| 2001/0029420 | A1 * | 10/2001 | Kawasaki et al. | 701/80 |
| 2002/0166373 | A1 * | 11/2002 | Mancosu et al. | 73/146 |
| 2003/0050743 | A1 * | 3/2003 | Caretta et al. | 701/1 |
| 2005/0204806 | A1 * | 9/2005 | Brusarosco et al. | 73/146 |
| 2007/0219672 | A1 * | 9/2007 | Fehr et al. | 701/1 |

FOREIGN PATENT DOCUMENTS

| | | | | |
|---|---|---|---|---|
| JP | 60148769 | A | * | 8/1985 |
| JP | 03281406 | A | * | 12/1991 |
| JP | 2002120530 | A | * | 4/2002 |
| JP | 2003154825 | A | * | 5/2003 |
| JP | 2003276627 | A | * | 10/2003 |
| JP | 2005008039 | A | * | 1/2005 |
| JP | 2006168633 | A | * | 6/2006 |
| WO | WO 98/56606 | | | 12/1998 |
| WO | WO 01/08908 | A1 | | 2/2001 |
| WO | WO 01/19653 | A1 | | 3/2001 |
| WO | WO 01/36241 | A1 | | 5/2001 |
| WO | WO 01/60644 | A1 | * | 8/2001 |
| WO | WO03082643 | A1 | * | 10/2003 |

OTHER PUBLICATIONS

Emerging Technologies in Automobiles; Khan, I.A.; Emerging Technologies, 2006. ICET '06. International Conference on Nov. 13-14, 2006 pp. 368-377 Digital Object Identifier 10.1109/ICET.2006.335943.*

Development of Reduced Order Model for Modeling Performance of Tire Pressure Monitoring System; Song, H.J.; Colburn, J.S.; Hsu, H.P.; Wiese, R.W.; Vehicular Technology Conference, 2006. VTC-2006 Fall. 2006 IEEE 64th; Sep. 2006 pp. 1-5 Digital Object Identifier 10.1109/VTCF.2006.608.*

Wheel slip control systems utilizing the estimated tire force; Daegun Hong; Paljoo Yoon; Hyoung-Jin Kang; Inyong Hwang; Kunsoo Huh;American Control Conference, Jun. 14-16, 2006 Page(s):6 pp. Digital Object Identifier 10.1109/ACC.2006.1657662.*

An experimental study with alternate measurement systems for estimation of tire-road friction coefficient; Wang, J.; Agrawal, P.; Alexander, L.; Rajamani, R.; American Control Conference, 2003. Proceedings of the 2003; vol. 6, Jun. 4-6, 2003 pp. 4957-4962 vol. 6; Digital Object Identifier 10.1109/ACC.2003.1242509.*

Impact of Inter-Vehicular Interference on the Performance of Tire Pressure Monitoring Systems; Kukshya, V.; Song, H.J.; Hsu, H.P.; Wiese, R.W.; Vehicular Technology Conference, 2007, VTC-2007 Fall. 2007 IEEE 66th; Sep. 30, 2007-Oct. 3, 2007 pp. 778-781; Digital Object Identifier 10.1109/VETECF.2007.172.*

Intra-vehicular Wireless Networks ☐☐ Ahmed, Mohiuddin; Saraydar, Cem U.; ElBatt, Tamer; Yin, Jijun; Talty, Timothy; Ames, Michael; Globecom Workshops, 2007 IEEE; Nov. 26-30, 2007 pp. 1-9 Digital Object Identifier; 10.1109/GLOCOMW.2007.4437827.*

Monitoring system design for estimating the lateral tire force; Kunsoo Huh; Joonyoung Kim; Kyongsu Yi; Dong-il Dan Cho; American Control Conference, 2002. Proceedings of the 2002; vol. 2, May 8-10, 2002 pp. 875-880 vol. 2; Digital Object Identifier 10.1109/ACC.2002.1023126.*

A watch in developments of intelligent tire inspection and monitoring; Li Li; Fei-Yue Wang; Qunzhi Zhou; Vehicular Electronics and Safety, 2005, IEEE International Conference on Oct. 14-16, 2005 pp. 333-338; Digital Object Identifier 10.1109/ICVES.2005.1563668.*

Characterizing performance of tire pressure monitoring systems using experimental measurements and system stimulations Kukshya, Vikas; Song, Hyok J.; Hsu, Hui P.; Wiese, Richard W.; Antennas and Propagation International Symposium, 2007 IEEE Jun. 9-15, 2007 pp. 4112-4115; Digital Object Identifier 10.1109/APS.2007.4396445.*

A Piezo-Sensor-Based "Smart Tire" System for Mobile Robots and Vehicles; Jingang Yi; Mechatronics, IEEE/ASME; Transactions on; vol. 13, Issue 1, Feb. 2008 pp. 95-103; Digital Object Identifier 10.1109/TMECH.2007.915064.*

Monitoring and managing tire pressure; Kowalewski, M.; Potentials, IEEE; vol. 23, Issue 3, Aug.-Sep. 2004 pp. 8-10 Digital Object Identifier 10.1109/MP.2004.1341778.*

A Quadric Image Segmentation for the Feature Extraction of Tire Surface Wear; Chao Zhang; Yin-Hang Cheng; Intelligent Systems Design and Applications, 2006. ISDA '06. Sixth International Conference on; vol. 2, Oct. 2006 pp. 457-462 Digital Object Identifier 10.1109/ISDA.2006.253880.*

ZigBee-based Intra-car Wireless Sensor Network; Hsin-Mu Tsai; Saraydar, C.; Talty, T.; Ames, M.; Macdonald, A.; Tonguz, O.K.; Communications, 2007. ICC '07. IEEE International Conference on; Jun. 24-28, 2007 pp. 3965-3971; Digital Object Identifier 10.1109/ICC.2007.653.*

A Hybrid Template Match Approach Based on Wavelet Analysis and Threshold Segmentation for Detecting Tire Surface Wear Zhang, Chao; Cheng, Yin-hang; Control and Automation, 2007, ICCA 2007. IEEE International Conference on; May 30, 2007-Jun. 1, 2007 pp. 1079-1084; Digital Object Identifier 10.1109/ICCA.2007.4376525.*

Robust vehicle yaw control using active differential and internal model control techniques; Canale, M.; Fagiano, L.; Milanese, M.; Borodani, P.; American Control Conference, 2006; Jun. 14-16, 2006 Page(s):6 pp.; Digital Object Identifier 10.1109/ACC.2006.1657574.*

Design of a rally driver support system using ecological interface design principles; Kruit, J.D.; Mulder, M.; Amelink, M.; van Paassen, M.M.; Systems, Man and Cybernetics, 2005 IEEE International Conference on; vol. 2, Oct. 10-12, 2005 pp. 1235-1239 vol. 2; Digital Object Identifier 10.1109/ICSMC.2005.1571315.*

Optimal path design in robot soccer environment: Lepetic, M.; Klancar, G.; Skrjanc, I.; Matko, D.; Potocnik, B.; Industrial Technology, 2003 IEEE International Conference on; vol. 2, Dec. 10-12, 2003 pp. 778-783 vol. 2; Digital Object Identifier 10.1109/ICIT.2003.1290756.*

Path planning considering acceleration limits; Lepetic, M.; Klancar, G.; Skrjanc, I.; Matko, G.; Potocnik, B.; Eurocon 2003. Computer as a Tool. The IEEE Region 8; vol. 1, Sep. 22-24, 2003 pp. 337-341 vol. 1.*

* cited by examiner

TYRE, WHEEL, METHOD AND SYSTEM FOR MONITORING THE TYRE, AND METHOD FOR CONTROLLING A VEHICLE

CROSS-REFERENCE TO RELATED APPLICATIONS

This application is a national-phase entry under 35 U.S.C. § 371 from International Application No. PCT/EP03/03088, filed Mar. 25, 2003, in the European Patent Office, the content of which is relied upon and incorporated herein by reference; additionally, Applicants claim the right of priority under 35 U.S.C. § 119(a)-(d) based on International Application No. PCT/EP02/03498, filed Mar. 28, 2002, in the European Patent Office.

BACKGROUND OF THE INVENTION

1. Field of the Invention

The present invention relates to a method and system for monitoring the behavior of a tyre during the running of a motor vehicle equipped with tyres. The present invention relates also to a method for controlling a vehicle.

2. Description of the Related Art

Tyre monitoring systems using accelerometers disposed within tyres have already been proposed.

EP patent application no. 887,211 describes a tyre monitoring system for a tyre on a vehicle comprising: a sensor device operatively arranged with respect to the tyre to create an electrical pulse during the footprint pass corresponding to a deformation of the tyre; means for calculating a ratio of the duration of said electrical pulse to the duration of one tyre revolution; means for transmitting said ratio to an evaluating unit placed in the vehicle. The sensor device is placed within the tread area of said tyre in order that said electrical pulse presents a first maximum at the entrance and a second maximum at the leaving of said footprint pass. The sensor device can be an accelerometer that measures the intensity of the acceleration supported by the tread. The aim of the solution disclosed in the '211 patent application is the monitoring of the tyre deflection in order to obtain an optimum performance, particularly for truck tyres.

U.S. Pat. No. 6,204,758 describes a tyre monitor for use in a remote tyre monitor system including an accelerometer for detecting acceleration of the tyre monitor. Position information for the tyre monitor is determined in response to the acceleration. In this manner, tyre position information is determined automatically to allow the system to display tyre characteristic data such as air pressure in conjunction with tyre position. More particularly, the tyre monitor includes a housing and a valve stem and is configured for mounting on a wheel of a vehicle. The valve stem opens to admit air for filling the tyre and for manual checks of the tyre pressure. Otherwise, the valve stem generally remains closed to seal the tyre. The tyre monitor includes a radial accelerometer, a tangential accelerometer, a yaw accelerometer, and a pressure sensor.

PCT patent application no. 98/56606 discloses a method for monitoring a running motor vehicle tyre, and, in particular, a device comprising: a sensor mounted on the wheel, coupling means transmitting to the vehicle indications obtained from the sensor and power supply means. The sensor is a miniature sensor sensitive to acceleration, implanted in the tyre running tread or in proximity thereof. The coupling means, mounted on the wheel, transmit the indications relative to the measurements carried out when the running tread is in contact with the ground. More particularly, the authors consider a tyre having a radius R traveling at a speed V. A tyre portion BC, having a length L, is in contact with ground, under load. In a point A, outside the portion BC, the centrifugal radial acceleration is $V^2/R$. On the other hand, between the points B and C the centrifugal radial acceleration is substantially zero, in that the differential speed of the tyre with respect to the ground is substantially zero. By implanting an accelerometer within the tyre, the portion BC can be detected. The aim disclosed by the authors for such kind of measurement is to detect a possible under-inflation of a tyre.

SUMMARY OF THE INVENTION

The Applicant has faced the problem of monitoring the dynamic behavior of a tyre mounted on a vehicle. More particularly, the Applicant has faced the problem of deriving information from a rolling tyre mounted on a vehicle, the information being useful:

a) to identify the manoeuvre that is being executed by the vehicle (e.g. cornering, braking, etc.);
b) to reveal whether a critical condition is being reached during said manoeuvre;
c) in case b), to generate a signal adapted to cause a counteraction to control the vehicle, e.g. an alarm signal for the driver or a signal adapted to activate an auto-control system of the vehicle.

The Applicant has found that measurements performed by acceleration sensors disposed in correspondence of the tread area of the tyre allow to derive such information. More particularly, the Applicant has found that such information can be derived by at least two acceleration sensors, disposed substantially along the same meridian plane of the tyre (i.e., a plane including the rotation axis of the tyre), in correspondence of the tread area of the tyre. The acceleration sensors provide signals representative of the deformations in the whole interaction region between the tyre and the ground. An analysis of the variations during time of the deformations then allows to identify the manoeuvre being performed. In a preferred embodiment, three acceleration sensors are disposed substantially on the same meridian plane in correspondence of the tread area of the tyre, a first one being disposed substantially on the equatorial plane of the tyre and the other two being disposed in shoulder regions of the tread area (i.e., portions of tread area disposed between the equatorial plane and the sidewalls of the tyre).

In a first aspect, the invention relates to a method for monitoring a tyre during running, said tyre having a tread area, the method comprising the steps of:

acquiring and storing, at least temporarily, a first curve representing an acceleration profile of a first point of the tread area of said tyre, located on a meridian plane of said tyre;

acquiring and storing, at least temporarily, at least a second curve representing the acceleration profile of a second point of the tread area of said tyre, located substantially on said meridian plane;

comparing said first and second curves, or parameters derived thereof, so as to determine a dynamic behavior of said tyre.

Preferably, the method further comprises the step of:

acquiring and storing, at least temporarily, at least a third curve representing the acceleration profile of a third point of the tread area of said tyre, being located substantially on said meridian plane.

The step of comparing may comprise comparing said first, second and third curves, or parameters derived thereof.

Preferably, said first point is located in a first shoulder region of said tread area.

Advantageously, said second point is located in a second shoulder region of said tread area, opposite to the first shoulder region with respect to an equatorial plane of said tyre.

The above cited third point may be located substantially on the equatorial plane of said tyre.

In preferred embodiments, said first, second and third points are located on an inner surface of said tyre.

Preferably, said step of comparing comprises comparing a distance between characteristic peaks of said first curve with a distance between corresponding peaks of said second curve.

Alternatively, said step of comparing may comprise comparing said first curve and said second curve point by point, for an entire revolution of said tyre.

Alternatively, said step of comparing may comprise comparing at least one characteristic peak of said first curve with a corresponding at least one peak of said second curve.

In particular, said step of comparing may comprise comparing an amplitude of said at least one peak of the first curve with an alititude of said corresponding at least one peak of the second curve.

Alternatively, said step of comparing may comprise comparing an area under at least a portion of said first curve with an area under a corresponding portion of said second curve.

Alternatively, said step of comparing may comprise comparing a width of at least a portion of said first curve with a width of a corresponding portion of said second curve.

In a second aspect, the invention relates to a tyre comprising at least a first group of sensors located in a first circumferential position of said tyre, said first group of sensors including:
- a first acceleration sensor, associated with a first point of the tread area of said tyre, located on a meridian plane of said tyre;
- at least a second acceleration sensor, associated with a second point of the tread area of said tyre, located substantially on said meridian plane.

Preferably, said first group of sensors includes at least a third acceleration sensor, associated with a third point of the tread area of said tyre, located substantially on said meridian plane.

Preferably, said first point is located in a first shoulder region of said tread area.

Advantageously, said second point is located in a second shoulder region of said tread area, opposite to the first shoulder region with respect to an equatorial plane of said tyre.

The above cited third point may be located substantially on the equatorial plane of said tyre.

In preferred embodiments, said first, second and third points are located on an inner surface of said tyre.

In particular, said first, second and third points may be misaligned of an angle not greater than 5°, preferably not greater than 3°, more preferably not greater than 1°.

Preferably, said first and second points are located at a distance from the equatorial plane of the tyre comprised between 15% and 30%, more preferably between 18% and 28%, even more preferably 20% and 25% of the whole tread width.

The tyre according to the second aspect of the invention may further include at least a second group of said sensors, located in a second circumferential position of said tyre, spaced from said first circumferential position of a predetermined angle.

In a preferred embodiment, the tyre according to the second aspect of the invention further includes at least a third group of said sensors. The first, second and third group of sensors are spaced one from each other of substantially the same angle.

Each of said acceleration sensors may include an elaboration unit.

In a third aspect, the invention relates to a wheel for a vehicle, including a rim and a tyre. With regards to the tyre, reference is made to what said above.

The wheel may also include a further acceleration sensor associated with said rim.

In a fourth aspect, the invention relates to a system for monitoring a tyre during running, including a tyre comprising at least a first group of sensors, and a receiving unit associated with at least said first group of sensors, said first group of sensors including:
- a first acceleration sensor, associated with a first point of the tread area of said tyre, located on a meridian plane of said tyre;
- at least a second acceleration sensor, associated with a second point of the tread area of said tyre, located substantially on said meridian plane.

The receiving unit may comprise a receiver and an elaboration unit.

With regards to the tyre included in the system, reference is made to what said above.

In a fifth aspect, the invention relates to a method for controlling a vehicle, comprising the steps of:
- providing, in at least one tyre mounted on the vehicle, at least a first group of sensors including at least a first acceleration sensor, associated with a first point of a tread area of said tyre, and at least a second acceleration sensor, associated with a second point of said tread area, said first and second points being both located substantially on a same meridian plane of said tyre;
- acquiring and storing, at least temporarily, at least a first acceleration curve from said first acceleration sensor and at least a second acceleration curve from said second acceleration sensor;
- comparing said first and second curves, or parameters derived thereof;
- identify a manoeuvre of said vehicle from said comparison.

The method may further include the steps of:
- revealing, from said comparison, whether a critical condition is being reached during said manoeuvre;
- if a critical condition is being reached, generating a signal adapted to cause a counteraction to control the vehicle.

In one embodiment, said signal may be adapted to activate an alarm for a driver of the vehicle.

In another embodiment, said signal may be adapted to activate an auto-control system of the vehicle.

Characteristics and advantages of the invention will now be illustrated with reference to embodiments represented in the attached figures, in which:

FIG. 1 schematically shows a transverse section of a tyre having three acceleration sensors disposed on the liner internal surface, according to a preferred embodiment of the present invention;

FIG. 2 schematically shows an equatorial section of a tyre having three groups of acceleration sensors disposed on the liner internal surface, according to a further preferred embodiment of the present invention;

DETAILED DESCRIPTION OF THE EXEMPLARY EMBODIMENTS

Figure 1:
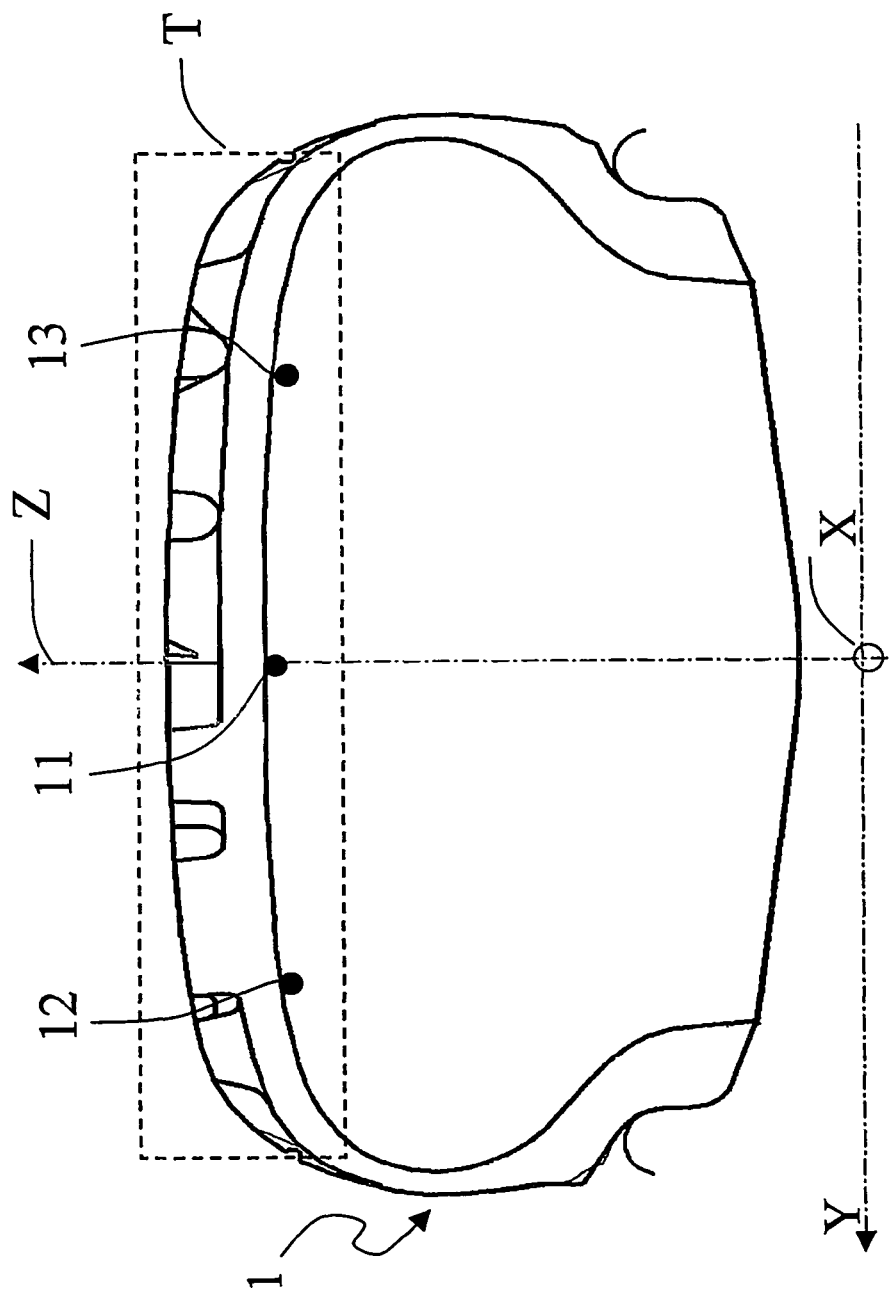

FIG. 1 shows an exemplary tyre 1 comprising an internally hollow toroidal structure formed by a plurality of components, and primarily by a carcass, terminating in two beads, each formed along an inner circumferential edge of the carcass, for securing the tyre to a corresponding supporting rim. The tyre 1 typically comprises at least one pair of annular reinforcing cores, called bead cores, which are inserted in the said beads. The carcass has a supporting structure formed by at least one reinforcing ply which includes textile or metallic cords, axially extending from one bead to the other according to a toroidal profile, the ends of which are associated with a corresponding bead core. In radial tyres, the aforesaid cords lie essentially in planes containing the axis of rotation of the tyre.

In crown of this carcass, an annular structure, known as belt structure, is placed, normally comprising one or more strips of rubberized fabric, wound on top of each other. A tread made from elastomeric material, wound around the belt structure, and usually molded with a relief pattern for the rolling contact of the tyre with the road is also added. Two sidewalls, made from elastomeric material, each extending outwards in radial direction from the outer edge of the corresponding bead, are also placed on the carcass, in axially opposed positions.

In tubeless tyres the inner surface of the carcass is normally covered with at least one liner layer, i.e. with one or more layers of airtight elastomeric material. The tyre 1 may further comprise other known elements, such as edges, strips and fillers, according to the specific design of the tyre.

For the purposes of the present description, the term "elastomeric material" indicates a material obtained by crosslinking a rubber composition comprising at least an elastomeric polymer having at least a filler dispersed therein and usually conventional additives such as curatives, processing aids, etc. . . . The combination of all these elements determines the mechanical characteristics of elasticity, rigidity and resistance to deformation of the tyre, which constitute the connection between the system of forces applied to the tyre and the extent of the corresponding deformations which it undergoes.

One aspect of the present invention relates to the real time measurement of the variations of the acceleration of specified points of a tyre in a given temporal interval. Said variations are in relationship with the interactions between the tyre in motion and the ground and are in relationship with the deformations of the tyre itself during motion. To this purpose, at least two sensors able to measure said acceleration are disposed substantially along the same meridian plane within the tyre 1. For the purposes of the present invention, the expression "substantially along the same meridian plane" contemplates a certain amount of misalignment of the acceleration sensors with respect to said meridian plane, that can be expressed in terms of the angle comprised between the meridian planes defined by the acceleration sensor positions. Preferably, the tolerated misalignment may correspond to an angle not greater than 5°, more preferably not greater than 3°, even more preferably not greater than 1°. More particularly, the sensors are disposed in correspondence of the tread area T of the tyre 1, i.e., the portion of the tyre 1 axially extended between the sidewalls of the tyre 1 (see FIG. 1). Preferably, at least three acceleration sensors are disposed along substantially the same meridian plane of the tyre 1.

In the embodiment shown in FIG. 1, three sensors 11, 12, 13 are disposed on the internal surface of the tyre 1, on the inner liner surface. A first sensor 11 is disposed substantially along the equatorial plane of the tyre 1. Two other sensors 12, 13 are disposed substantially on the same meridian plane of the tyre 1 in shoulder regions of the tread area, i.e. between the equatorial plane and a respective sidewall of the tyre 1. Hereinbelow, they will be named left shoulder sensor 12 and right shoulder sensor 13. As it will specified in the following, said disposition allows to monitor the general behavior of the full interaction area between the tyre and the road; for instance when the tyre is cornering the signals derived from the two sensors 12 and 13 change relative to each other. In order to ensure a good monitoring of the whole interaction area between the tyre and the road, the acceleration sensors should be separated from each other of a certain distance. However, with regards to acceleration sensors disposed in the shoulder regions of the tread area, they should be disposed sufficiently far away from the sidewalls, so that they can provide signals in almost every condition of travel. In this respect, it has to be noticed that vehicle regulations, such as for example the camber, in combination with particular manoeuvres of the vehicle (e.g. in sharp bends) may cause transient partial loss of interaction between portions of the tread near the sidewall and the ground. Preferably, a shoulder acceleration sensor should be disposed at a distance from the equatorial plane of the tyre comprised between 15% and 30% of the tread width, more preferably between 18% and 28% of the tread width, even more preferably between 20% and 25% of the tread width. For example, in a tyre having a tread width of 195 mm, two shoulder sensors may be disposed on opposite sides with respect to the equatorial plane, each at a distance of 45 mm thereof.

Preferably, at least one acceleration sensor measures the acceleration of the respective monitored point of the tyre 1 with respect to at least two directions orthogonal to each other. More preferably, all acceleration sensors measure the acceleration with respect to at least two directions orthogonal to each other. For example, in FIG. 1 the x, y and z local axes represent three directions that for the purposes of the present description are named respectively:

centripetal direction z, which is a radial direction of said tyre, tangential direction y, which is a direction tangential to the circumference of said tyre, lateral direction x, which is a direction orthogonal to both said centripetal and tangential directions.

Preferred directions for the measurements are the centripetal and the tangential direction.

Figure 2:
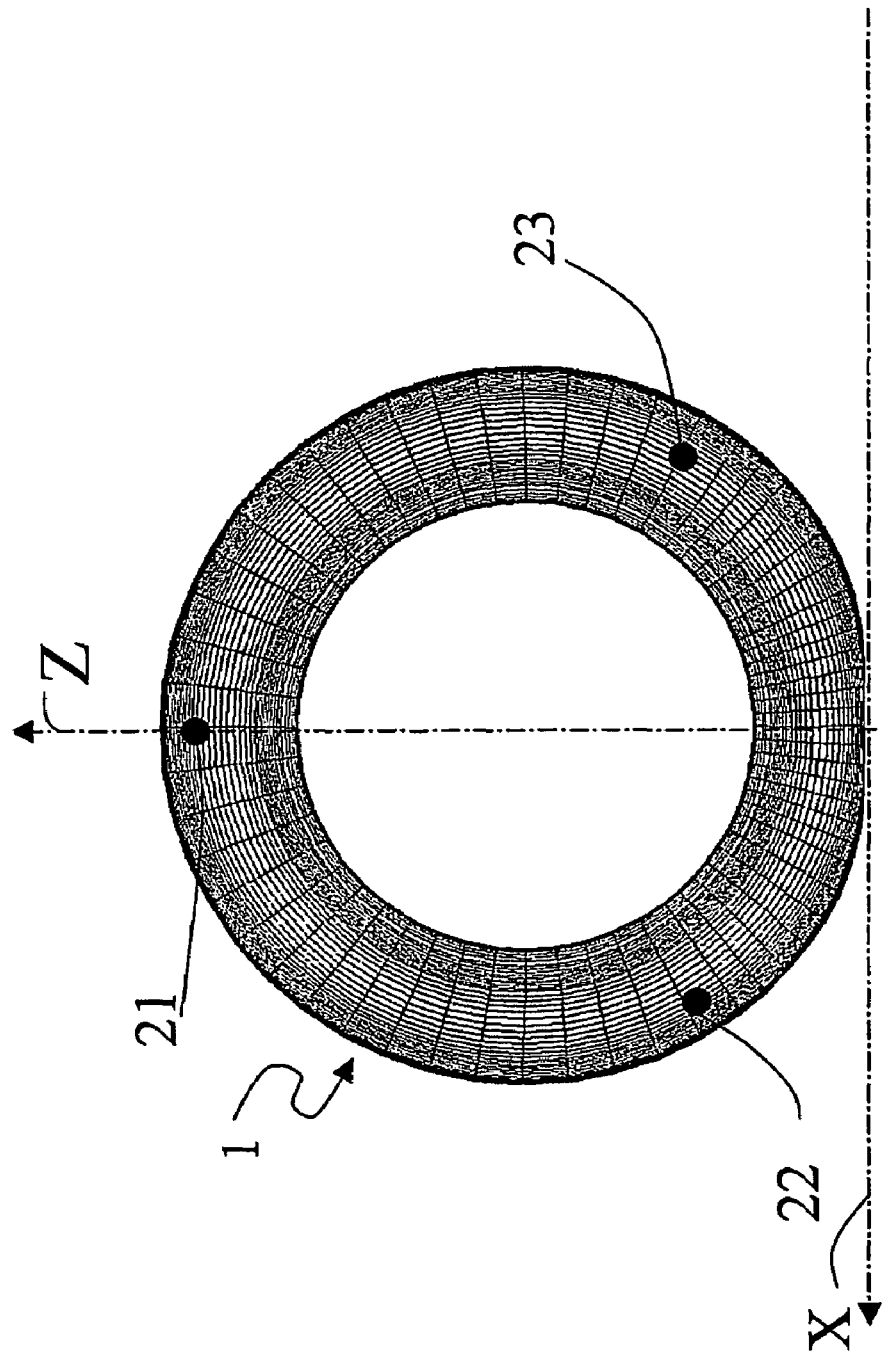

In FIG. 2 a further embodiment of the present invention is shown, in which several groups of acceleration sensors 21, 22, 23 are associated to a tyre 1. Each group of acceleration sensors 21, 22, 23 comprises acceleration sensors disposed substantially along the same meridian plane of the tyre 1, as disclosed above with reference to FIG. 1. Preferably, the groups of acceleration sensors are located in a circumferential position spaced one from each other of substantially the same angle. For example, in FIG. 2 three groups of acceleration sensors are shown, spaced from each other of an angle of substantially 120°. As far as the disposition of the acceleration sensors within each group 21, 22 or 23 in the embodiment of FIG. 2, reference is made to what disclosed above with reference to FIG. 1.

The use of plurality of groups of acceleration sensors as shown in FIG. 2 allows to achieve more accuracy and reliability of the measurements performed by the acceleration sensors, as well as a better monitoring of the entire wheel turn. For example, during a revolution of the tyre 1 it is possible to monitor at the same time the acceleration during the tyre ground interaction with a first group of sensors, the acceleration of a point located before the footprint pass with a second group of sensors and the acceleration of a point located after the footprint pass with a third group of sensors.

The acceleration sensors 11, 12, 13 and/or 21, 22, 23, may be typically packaged in respective sensor devices further including: a power supply, such as for example a battery or a self-generating power device (e.g., a piezoelectric device generating electrical energy thanks to the deformations subjected by the tyre during rotation), for energizing the acceleration sensor; a transmitter connected to the acceleration sensor and to the power supply; an antenna connected to the transmitter. Furthermore, the acceleration sensors 11, 12, 13 and/or 21, 22, 23 are typically associated with a receiving device, typically including an antenna, a receiver and an elaboration unit. Such receiving device may be preferably disposed on the vehicle. For example said receiving device may be part of an on-board computer of the vehicle.

The acceleration sensors generate a signal correspondent to the acceleration of the respective point of the tyre 1 to which they are associated. Said signal is then transmitted to the receiver, typically by means of radio frequencies. The elaboration unit may comprise, for example, a programmed microprocessor having a volatile storage element, a permanent storage element and a CPU. The elaboration unit receives the acceleration signals and performs the elaborations needed in order to identify, from said signals, what kind of manoeuvre (e.g. braking, acceleration, cornering, etc.) is being performed by the tyre or by the vehicle. Furthermore, it can also derive if a critical condition is being reached by the tyre or by the vehicle during such manoeuvre (for example due to aquaplaning). In such case, a signal can be generated, to cause a counter-action to control the vehicle, e.g. by the driver or by auto-control systems of the vehicle.

The elaborations needed in order to identify from the acceleration measurements the manoeuvre performed by the tyre, as well as to foresee if a critical situation is being reached, include the comparison of the signals measured from two acceleration sensors disposed substantially on the same meridian plane of the tyre 1. As it will be shown below, a measurement performed by a single acceleration sensor cannot give sufficient information for the above mentioned purposes.

Figure 3:
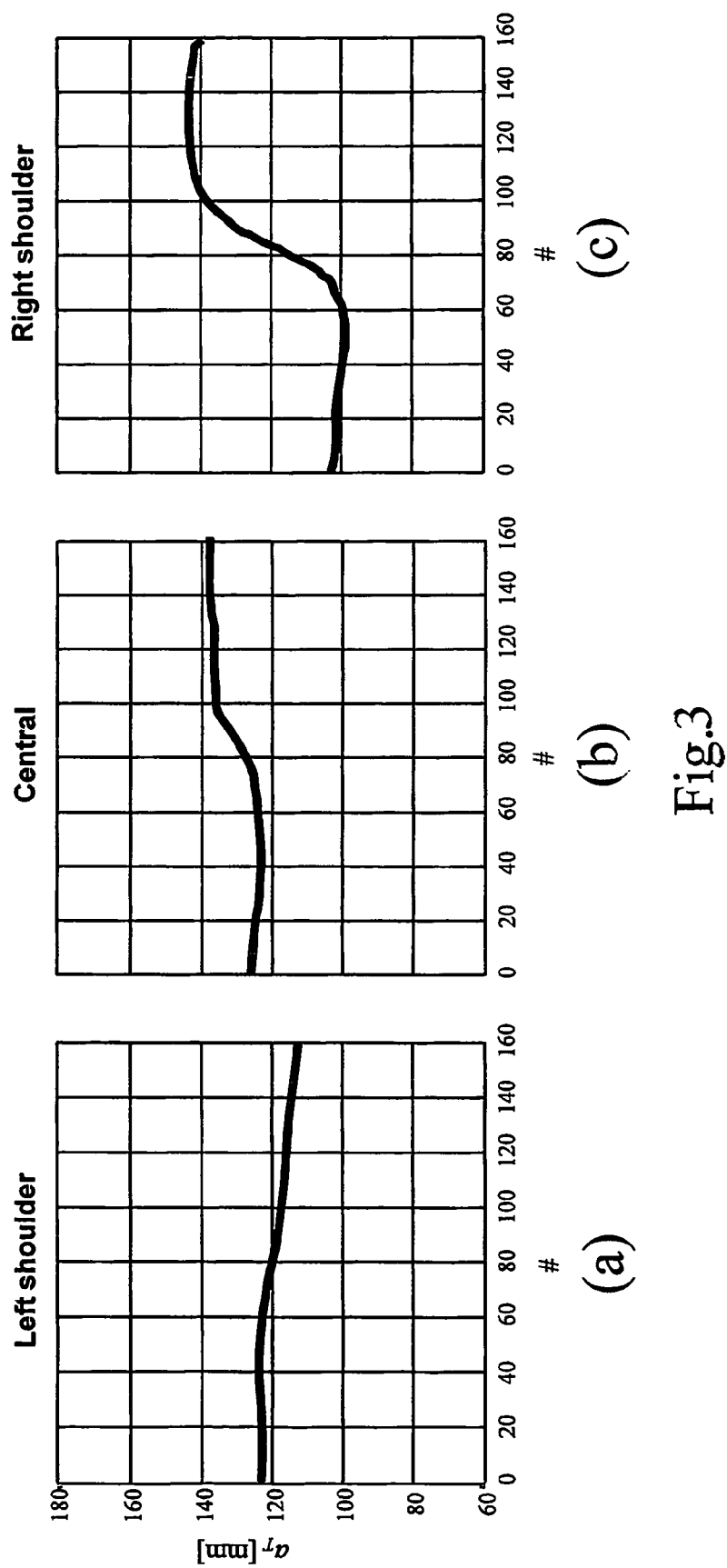
FIG. 3 shows three plots of contact length versus number of wheel turns for a cornering tyre, the contact length being calculated from measurements of tangential acceleration in a tyre configuration according to FIG. 1.

For example, FIGS. 3a, 3b, 3c show the result of elaborations performed on acceleration signals provided by acceleration sensors disposed within a tyre as shown in the embodiment of FIG. 1. The three acceleration sensors were disposed within a 195/65R15 Pirelli™ P6® tyre. The tyre was inflated at a pressure of 2.2 bar, subjected to a load of about 3700 N and mounted on the front right axle of a vehicle. The result shown by the three curves of FIG. 3 refers to a path covered by the vehicle at a speed of about 80 km/h, consisting of 150 m of straight road followed by a curve to the left having a radius of about 120 m.

Figure 4:
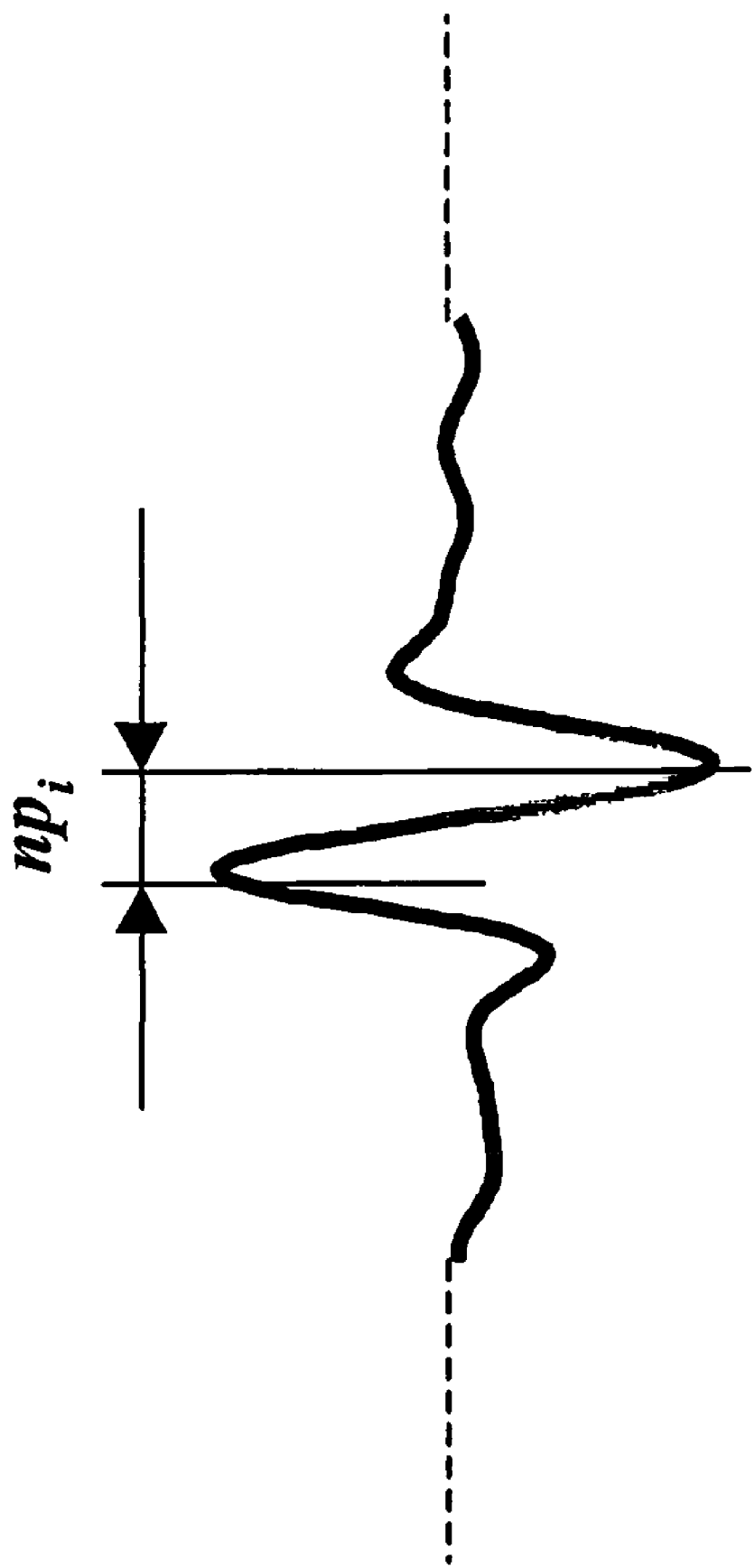
FIG. 4 shows a typical curve derived by a measurement of tangential acceleration.

FIG. 3a refers to an elaboration made on signals provided by a left shoulder acceleration sensor 12 (see FIG. 1), FIG. 3b refers to an elaboration made on signals provided by a central acceleration sensor 11 (see FIG. 1), FIG. 3c refers to an elaboration made on signals provided by a right shoulder acceleration sensor 13 (see FIG. 1). More particularly, the curves of FIGS. 3a, 3b, 3c show the contact length derived by a measurement of the tangential acceleration $a_T$, versus the number of turns # performed by the tyre during the above mentioned path. FIG. 4 shows a magnifying of the portion corresponding to the passage under the contact length in a typical signal measured by an acceleration sensor in tangential direction (acceleration versus time). By counting the number $np_i$ of points in the measured curve between the two discontinuities shown in FIG. 4 (corresponding to the beginning and the end of the passage under the contact length of the measuring acceleration sensor), and knowing the sampling frequency, the radius of the tyre and the angular speed of the tyre, it is possible to derive the contact length, i.e. the quantity plotted in FIGS. 3a, 3b, 3c. The contact length may also be derived by measurements of centripetal acceleration, according to the teachings of the above mentioned patent applications EP 887,211 and WO 98/56606.

Firstly, we consider a single plot among those shown in FIG. 3, corresponding to a measurement derived by a single acceleration sensor disposed within the tyre, for example the plot of FIG. 3b, derived by measurements performed by an acceleration sensor disposed at the equatorial plane of the tyre. As results from that plot, the contact length remains substantially unchanged around 125 mm in the first portion of the plot, and increases up to a value of about 140 mm in the second portion. The beginning of the increase in the contact length corresponds to the beginning of the curve during the traveled path. However, from the curve shown in FIG. 3b alone, unique information about what kind of manoeuvre (a cornering, in this case) is being performed by the vehicle cannot be derived. As a matter of fact, the increase in the contact length shown in FIG. 3b could correspond to an increase of the load charged on the wheel carrying the tyre, for example due to a braking, or, as another example, to a reduction of the pressure within the tyre. Thus, complete information allowing to identify the correct manoeuvre cannot be derived from the measurement of a single acceleration sensor.

On the contrary, by comparing the three curves of FIG. 3, the cornering of the vehicle can be detected. In fact, in the first portion of the plots of FIG. 3a, 3b, 3c, corresponding to the straight portion of the traveled path, the contact length derived by the measurements performed by the right shoulder acceleration sensor is lower than the contact length derived by measurements performed by the other acceleration sensors, due to the camber regulation of the vehicle. At the beginning of the curved portion of the traveled path, in the central portion of the plots 3a, 3b, 3c, different variations in the contact length can be observed: in particular, a strong increase of the contact length measured by the right shoulder acceleration sensor, as a consequence of the lateral thrust to which the vehicle is subjected during the curved traveled path. These differences in the measurements performed by the three acceleration sensors disposed according to the embodiment shown in FIG. 1 allow to detect, by means of a comparison between the signals or between the parameters derived from the signals (e.g., the contact length), the cornering manoeuvre of the vehicle. Furthermore, the comparison can reveal whether a critical condition is being reached, corresponding to abnormal differences between the detected signals or parameters in the detected manoeuvre.

Many types of comparisons can be performed from signals obtained by the different acceleration sensors included within the tyre, according to the present invention. Examples of comparisons between acceleration curves of acceleration versus time obtained by the different sensors comprise the following:

comparison of two curves completely point by point, for an entire revolution of a tyre;

comparison of some characteristic peaks of a first curve with correspondents characteristic peaks of a second curve, with particular reference to peak amplitudes;

comparison of the entire area under a first curve (or under a portion thereof) with the corresponding entire area under a second curve (or under the corresponding portion thereof;

comparison of the width of a portion of a first curve with the width of a corresponding portion of a second curve.

The information obtained from said comparisons can be used to set control actions of mechanisms of the motor vehicle, for example regulation of the brake system (longitudinal behavior and/or lateral one), or active suspension, etc.

In a preferred embodiment, an elaboration unit may be disposed also within each sensor device, associated to the respective acceleration sensor, so that already pre-elaborated signals can be sent to the receiving device disposed on the vehicle. In this case, the elaboration unit of the receiving device collects the pre-elaborated signals coming from all the acceleration sensors and performs the needed comparison between the different pre-elaborated signals, according to the invention. For example, such pre-elaborated signals may comprise parameters derived from the acceleration curves (such as, for example, peak amplitudes or peak-to-peak distances).

In preferred embodiments, the sensor devices including the acceleration sensors 11, 12, 13 and/or 21, 22, 23 are disposed on the internal surface of the tyre, in contact with the liner layer. Such disposition is preferred because a precise control of the position of the sensors may be achieved, together with a simple installation process. The sensors 11, 12, 13 and/or 21, 22, 23 may be associated to the inner liner surface by means of an adhesive or by mechanical means. Alternatively, one or more of said acceleration sensors may be inserted into the liner layer, or into the tread band layer, or into the carcass, or into the belt of the tyre during the manufacturing process.

In a further embodiment (not shown), at least one further acceleration sensor may be disposed in a sensor device placed on the rim of the wheel; in this case a comparison between the acceleration measured by the rim sensor and the acceleration measured by a sensor located in correspondence of the tread area may give an indication of the relative movement between the rim and the tyre for example during a braking manoeuvre.

The number and the arrangement of acceleration sensors to be disposed within the tyre depends on the specifications to be met. Generally speaking, a higher number of sensors corresponds to a better monitoring. However, a trade-off with costs, total added weight, elaboration requirements/capacity etc. should be taken also into consideration.

Figure 5:
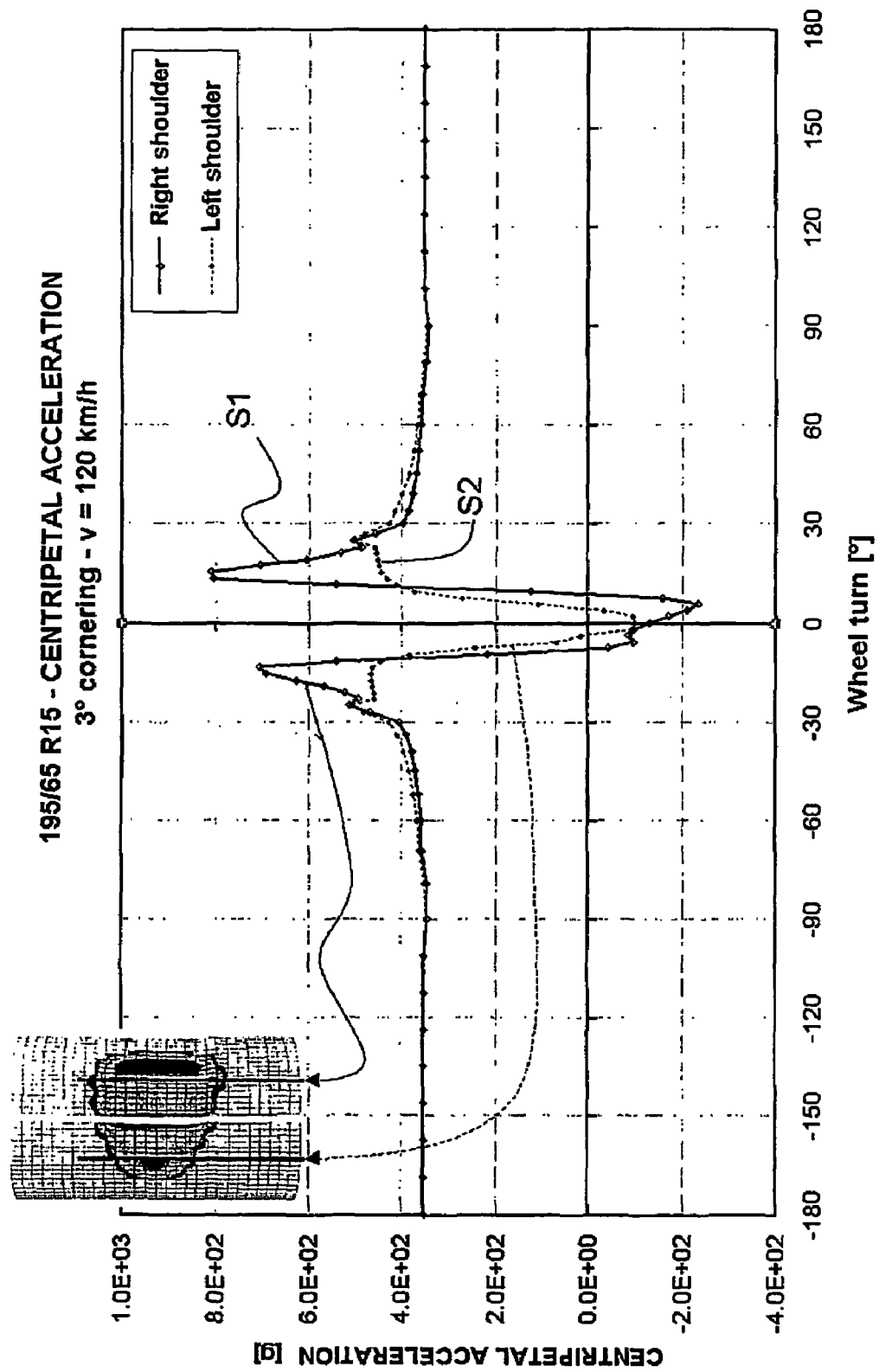
FIG. 5 shows two curves of centripetal acceleration measured by two acceleration sensors disposed in the shoulder regions of the tread area of a tyre, in a cornering condition.

For example, FIG. 5 shows the acceleration curves measured in centripetal direction by two acceleration sensors disposed in the right and in the left shoulder portion of the tread area of a 205/55/R16 Pirelli™ P7® tyre, inflated at a pressure of 2.2 bar, subjected to a load of 4500 N. This corresponds to the embodiment of FIG. 1, in which the central acceleration sensor 11 is removed. The first curve, referenced as S1 in FIG. 5, refers to the right shoulder sensor 13 of FIG. 1; the second curve, referenced as S2 in FIG. 5, refers to the left shoulder sensor 12 of FIG. 1. The exemplary tyre was in a left cornering condition of 3°, at a speed of 120 km/h.

As it can be seen, the right shoulder sensor (curve S1), in a region that contains the contact length of the tyre (including the peaks visible in FIG. 5), measures an acceleration which is greater than the acceleration measured from the left shoulder sensor (curve S2). This is due to the deformation of the tyre during the cornering condition. By monitoring the difference between the accelerations measured from said two sensors the system of the present invention is able to detect a critique condition during a cornering manoeuvre. For example said critique condition may be detected by comparing said difference of accelerations with a predetermined threshold value or by comparing (point to point) a curve monitored by the shoulder sensors with reference curves stored into one of said memory elements. Specified reference acceleration curves, or specified threshold values of parameters to be derived from the acceleration curves, may be stored in the volatile storage element or in the permanent storage element of the elaboration unit, in a temporary or permanent way respectively. The reference curves or threshold parameters may be stored during a setup phase of the system and may be generated by each of the acceleration sensors of the system.

Other information may be obtained by comparing signals derived from sensors associated to different tyres of a vehicle. For example, in order to completely monitor a braking of a vehicle, a comparison between signals derived from sensors of the front tyres and signals derived from sensors of the rear tyres of the vehicle may be realized. Another example of a comparison between signals derived from sensors located in different tyres of the vehicle may be accomplished during a cornering condition, in which the difference between signals derived from a tyre on one side of the vehicle may be compared with signals derived from a tyre on the other side of the vehicle.

The different acceleration curves are acquired during the running of the motor vehicle on the road, preferably at each revolution of the tyre. The curves (or the values of the parameters derived from characteristics portions of the curves, such as for example the peak values) may be stored temporarily to carry out the comparison with each other. Furthermore, the curves or the parameters acquired or derived in a revolution of the tyre may be compared with the curves or parameters acquired or derived in previous revolutions of the tyre, or during the contact of previous portions of the tyre with the ground (see FIG. 2). In this way, a complete monitoring of the behavior of the vehicle can be performed. Furthermore, main changes during the tyre life (e.g. due to wear or structural modification of the tyre) can also be detected, by comparing the different curves or the parameters generated by the sensor signals at different times (e.g., monthly).

Advantageously, the accelerations of the monitored points may be integrated with other information of the vehicle, for example the speed of the vehicle and/or the tyre pressure.

The invention claimed is:

1. A method for monitoring a tyre during running, comprising:

acquiring and storing, at least temporarily, a first curve representing an acceleration profile of a first point of a tread area of the tyre;

acquiring and storing, at least temporarily, a second curve representing an acceleration profile of a second point of the tread area; and comparing the first curve and the second curve, or parameters derived from the first curve and the second curve, so as to determine a dynamic behavior of the tyre;

wherein the first and second points are located substantially on a same meridian plane of the tyre.

2. The method of claim 1, further comprising:
acquiring and storing, at least temporarily, a third curve representing an acceleration profile of a third point of the tread area;
wherein the third point is located substantially on the same meridian plane of the tyre.

3. The method of claim 2, further comprising comparing the first curve, the second curve, and the third curve, or parameters derived from the first curve, the second curve, and the third curve, so as to determine a dynamic behavior of the tyre.

4. The method of claim 1, wherein the first point is located in a first shoulder region of the tread area.

5. The method of claim 4, wherein the second point is located in a second shoulder region of the tread area, and
wherein the second shoulder region is opposite to the first shoulder region with respect to an equatorial plane of the tyre.

6. The method of claim 2, wherein the third point is located substantially on an equatorial plane of the tyre.

7. The method of claim 2, wherein the first, second, and third points are located on an inner surface of the tyre.

8. The method of claim 1, wherein comparing the first curve and the second curve, or parameters derived from the first curve and the second curve, comprises comparing a distance between characteristic peaks of the first curve with a distance between corresponding peaks of the second curve.

9. The method of claim 1, wherein comparing the first curve and the second curve, or parameters derived from the first curve and the second curve, comprises comparing the first curve and the second curve point-by-point for an entire revolution of the tyre.

10. The method of claim 1, wherein comparing the first curve and the second curve, or parameters derived from the first curve and the second curve, comprises comparing one or more characteristic peaks of the first curve with a corresponding one or more peaks of the second curve.

11. The method of claim 1, wherein comparing the first curve and the second curve, or parameters derived from the first curve and the second curve, comprises comparing an amplitude of one or more characteristic peaks of the first curve with a corresponding amplitude of one or more peaks of the second curve.

12. The method of claim 1, wherein comparing the first curve and the second curve, or parameters derived from the first curve and the second curve, comprises comparing an area under at least one portion of the first curve with an area under a corresponding at least one portion of the second curve.

13. The method of claim 1, wherein comparing the first curve and the second curve, or parameters derived from the first curve and the second curve, comprises comparing a width of at least one portion of the first curve with a width of a corresponding at least one portion of the second curve.

14. A method for controlling a vehicle, comprising:
providing a first group of sensors in at least one tyre mounted on the vehicle;
acquiring and storing, at least temporarily, a first acceleration curve from a first acceleration sensor and a second acceleration curve from a second acceleration sensor;
comparing the first acceleration curve and the second acceleration curve, or parameters derived from the first acceleration curve and the second acceleration curve; and
identifying a maneuver of the vehicle based on the comparison;
wherein the first group of sensors comprises:
the first acceleration sensor; and
the second acceleration sensor;
wherein the first acceleration sensor is associated with a first point of a tread area of the tyre,
wherein the second acceleration sensor is associated with a second point of the tread area, and
wherein the first and second points are located substantially on a same meridian plane of the tyre.

15. The method of claim 14, further comprising:
revealing, from the comparison, whether a critical condition is being reached during the maneuver; and
if a critical condition is being reached, generating a signal adapted to cause a counteraction to control the vehicle.

16. The method of claim 15, wherein the signal is adapted to activate an alarm for a driver of the vehicle.

17. The method of claim 15, wherein the signal is adapted to activate an auto-control system of the vehicle.

* * * * *